(12) United States Patent
Hartl et al.

(10) Patent No.: US 12,134,124 B2
(45) Date of Patent: Nov. 5, 2024

(54) DETERMINING THE STATUS FOR STRAND-GUIDING ROLLERS BY MEANS OF VIBRATION EVALUATION

(71) Applicant: Primetals Technologies Austria GmbH, Linz (AT)

(72) Inventors: Franz Hartl, Kallham (AT); Eberhard Karnitsch-Einberger, Linz (AT); Franz Kolmbauer, Rio de Janeiro (BR); Anna Mayrhofer, Peuerbach (AT); Andreas Rohrhofer, Eferding (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 127 days.

(21) Appl. No.: 17/910,165

(22) PCT Filed: Mar. 10, 2021

(86) PCT No.: PCT/EP2021/055981
§ 371 (c)(1),
(2) Date: Sep. 8, 2022

(87) PCT Pub. No.: WO2021/180758
PCT Pub. Date: Sep. 16, 2021

(65) Prior Publication Data
US 2023/0089260 A1    Mar. 23, 2023

(30) Foreign Application Priority Data
Mar. 13, 2020 (EP) .................................. 20162928

(51) Int. Cl.
*B22D 11/22* (2006.01)
*B22D 11/06* (2006.01)
(Continued)

(52) U.S. Cl.
CPC .......... *B22D 11/22* (2013.01); *B22D 11/0677* (2013.01); *F16C 19/527* (2013.01); *G01H 1/003* (2013.01)

(58) Field of Classification Search
CPC ... B22D 11/06; B22D 11/0677; B22D 11/128; B22D 11/16; B22D 11/20; B22D 11/22
(Continued)

(56) References Cited

U.S. PATENT DOCUMENTS

| 6,179,041 B1 | 1/2001 | Pleschiutschnigg ........... 164/452 |
| 2001/0029785 A1 | 10/2001 | Heaslip et al. ................. 73/579 |

(Continued)

FOREIGN PATENT DOCUMENTS

| CN | 1246921 A | 3/2000 |
| CN | 101685042 A | 3/2010 |

(Continued)

OTHER PUBLICATIONS

Examination Report dated Dec. 6, 2023 issued in corresponding Indian Patent Application No. 202217047641 with English translation.
(Continued)

*Primary Examiner* — Kevin P Kerns
(74) *Attorney, Agent, or Firm* — OSTROLENK FABER LLP

(57) ABSTRACT

A strand-guiding section arranged downstream of a continuous casting mould of a continuous casting line. The strand-guiding section has at least one strand-guiding roller supporting a metal strand cast with the continuous casting mould, is mounted in roller bearings in the strand-guiding section, and has at least one sensor device, which has at least one vibration sensor acoustically coupled to the strand-guiding roller or its roller bearings to detect the vibrations occurring with the rotation of the strand-guiding roller in the
(Continued)

roller bearings. The strand-guiding roller is cooled internally by a cooling water. The vibration sensor is acoustically coupled to the strand-guiding roller and/or to the roller bearings via the cooling water. The evaluation device determines the status of the at least one roller bearing by evaluating the vibration data.

6 Claims, 11 Drawing Sheets

(51) Int. Cl.
 *F16C 19/52* (2006.01)
 *G01H 1/00* (2006.01)
(58) Field of Classification Search
 USPC ......... 164/452, 413, 150.1, 154.1, 441, 442, 164/447, 448
 See application file for complete search history.

(56) References Cited

U.S. PATENT DOCUMENTS

| | | | |
|---|---|---|---|
| 2003/0145976 A1* | 8/2003 | Von Wyl et al. .... | B22D 11/128 164/478 |
| 2005/0155429 A1 | 7/2005 | Griessler et al. ................ | 73/593 |
| 2010/0269556 A1* | 10/2010 | Moretto et al. ......... | B21B 37/68 72/12.5 |
| 2013/0276541 A1 | 10/2013 | Busch et al. ..................... | 73/649 |

FOREIGN PATENT DOCUMENTS

| CN | 102170984 A | 8/2011 |
|---|---|---|
| CN | 107321948 A | 11/2017 |
| DE | 102010056466 A1 | 7/2012 |
| EP | 0982579 A1 | 3/2000 |
| JP | S57209761 A | 12/1982 |
| JP | H08-257717 A | 10/1996 |
| KR | 19980044270 A | 9/1998 |
| KR | 19990006983 A | 1/1999 |

OTHER PUBLICATIONS

International Search Report mailed Jun. 11, 2021 in corresponding PCT International Application No. PCT/EP2021/055981.
Office Action dated Apr. 14, 2023 issued in corresponding Chinese Patent Application No. 2021800203983 with English translation.
Notice of Allowance dated Feb. 28, 2024, issued in corresponding Chinese Patent Application No. 202180020398.3.

* cited by examiner

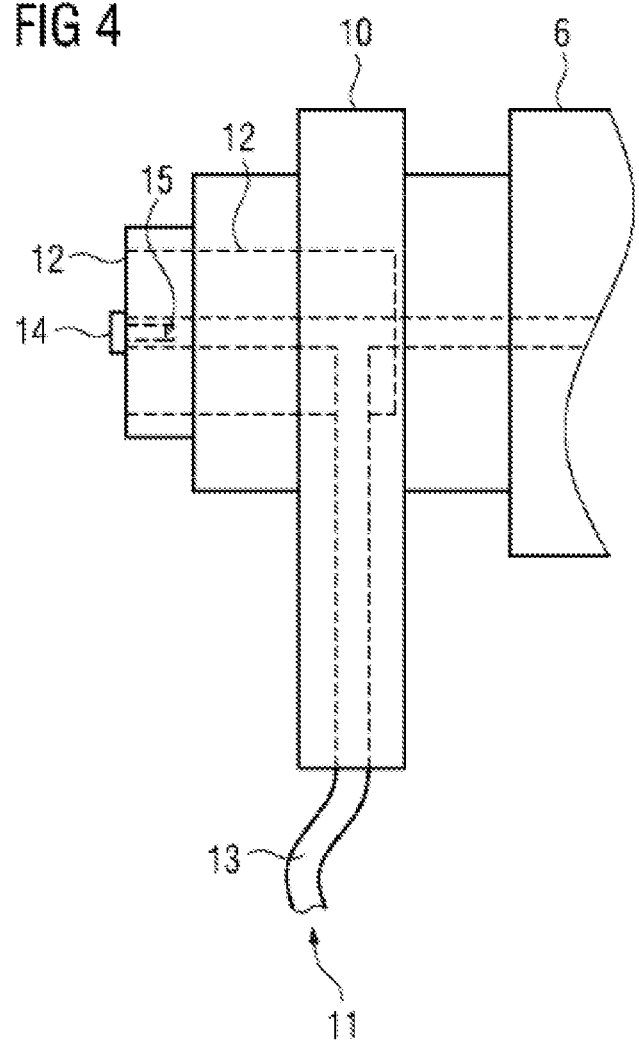

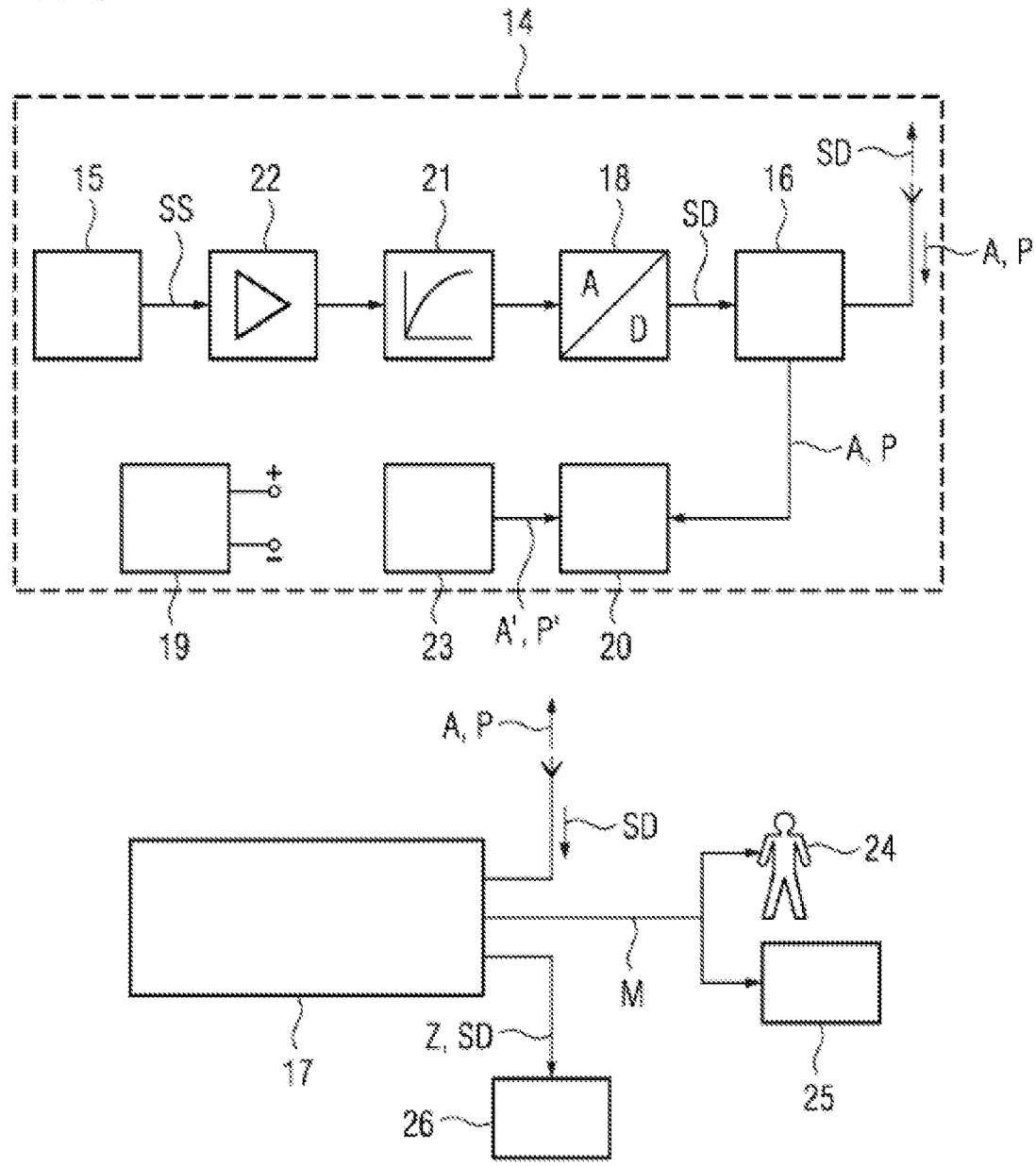

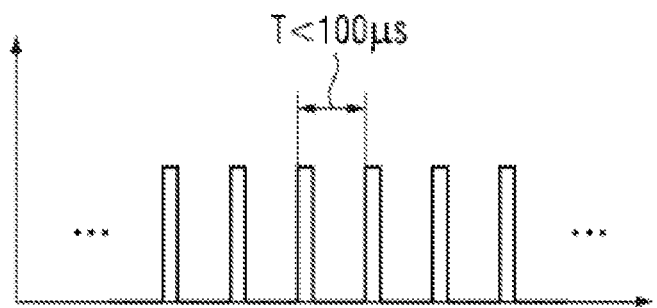
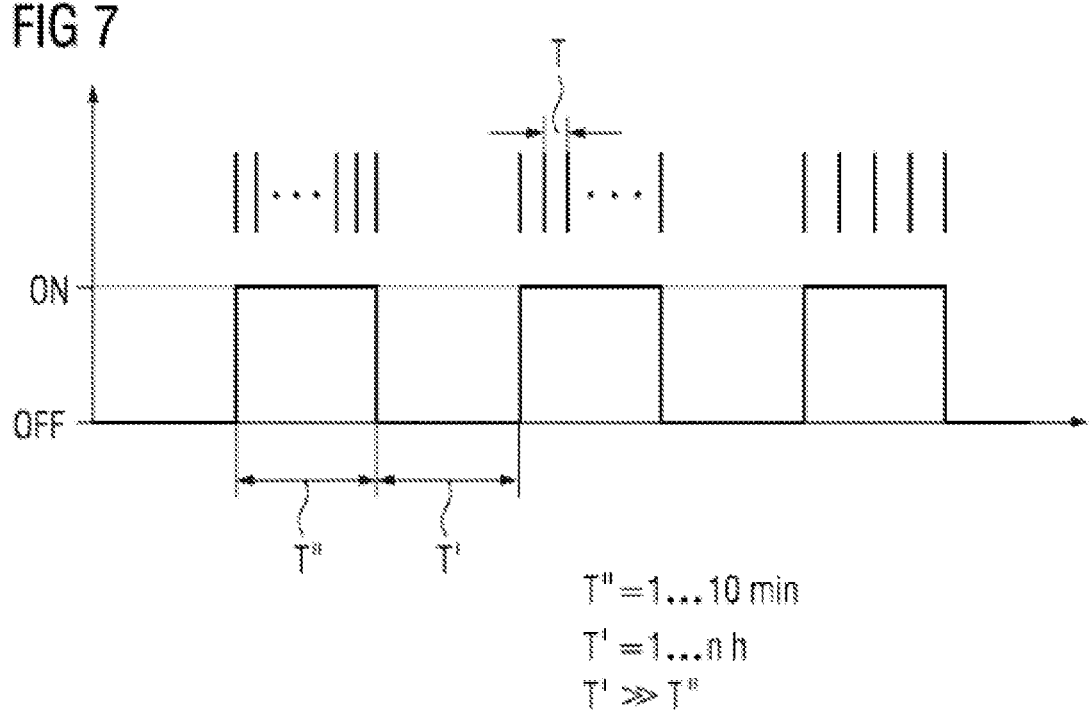

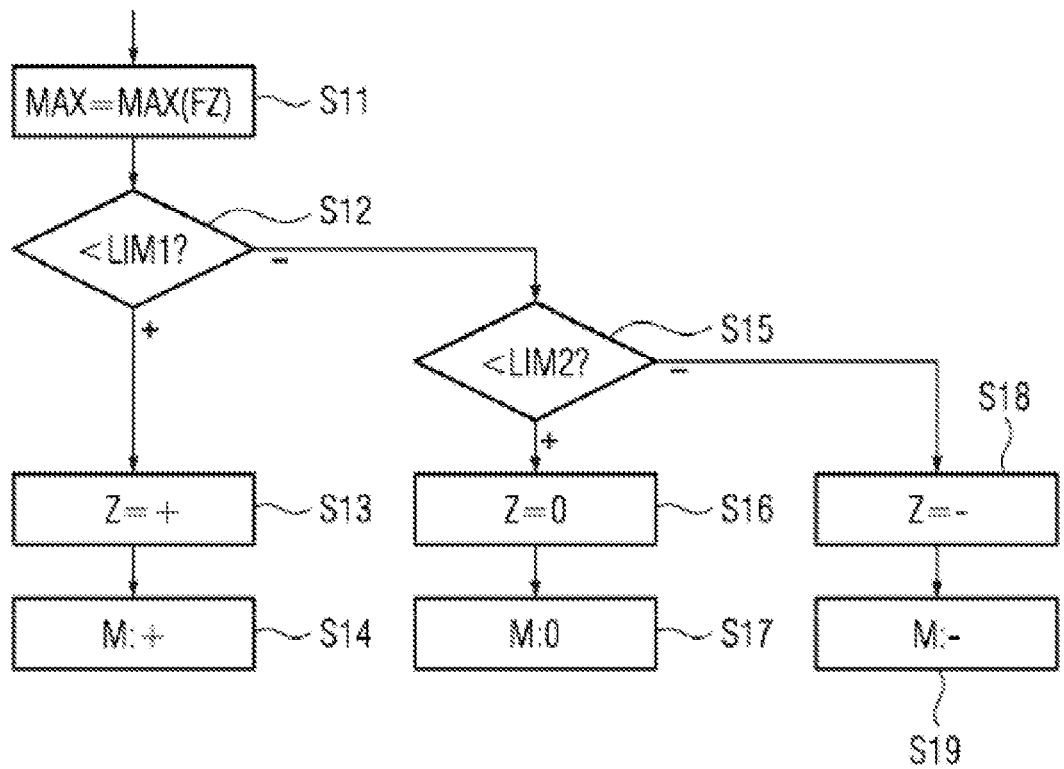
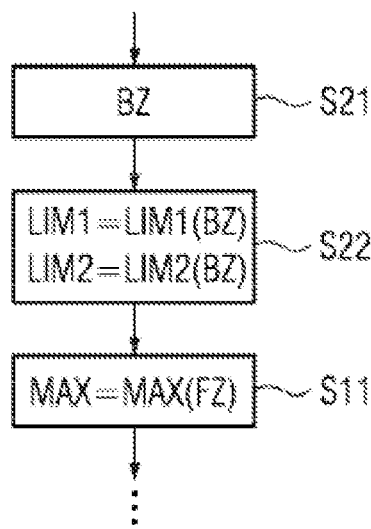

DETERMINING THE STATUS FOR STRAND-GUIDING ROLLERS BY MEANS OF VIBRATION EVALUATION

CROSS-REFERENCE TO RELATED APPLICATIONS

The present application is a 35 U.S.C. § 371 national stage application of PCT/US2021/055981, filed Mar. 10, 2021, which claims priority to European Patent Application EP 20162928.4, filed Mar. 13, 2020, the contents of which are incorporated herein by reference.

FIELD OF THE INVENTION

The present invention assumes a strand-guiding section of a continuous casting line,
  wherein the strand-guiding section is arranged downstream of a continuous casting mold of the continuous casting line,
  wherein the strand-guiding section has at least one strand-guiding roller to support a metal strand cast with the continuous casting mold,
  wherein the strand-guiding roller is mounted in roller bearings in the strand-guiding section.

The present invention further assumes a determination system for the status of at least one roller bearing of a strand-guiding roller of a strand-guiding section of a continuous casting line arranged downstream of a continuous casting mold of the continuous casting line.

PRIOR ART

In continuous casting lines, liquid metal—often steel—is poured from a casting ladle into a continuous mold via an intermediate distributor (tundish). The continuous casting mold is intensively cooled with water. As a result, the liquid metal solidifies on the side walls of the continuous casting mold and forms a strand shell. The core is still liquid. The partially solidified metal strand formed in this way is extracted from the continuous casting mold and intensively cooled further so that it gradually solidifies completely. After complete solidification, the metal strand can be cut off by means of a gas cutting machine or—in the case of continuous operation of a casting rolling plant—rolled directly.

After being extracted from the continuous casting mold, the metal strand is supported and guided by a plurality of strand-guiding rollers. The strand-guiding rollers themselves are mounted in roller bearings.

The strand-guiding rollers are cooled at least from the outside by the strand cooling system itself. Often, the strand-guiding rollers are also cooled internally by cooling water.

In this case, the strand-guiding rollers have rotary feed-throughs via which the cooling water is fed to each strand-guiding roller and discharged from the respective strand-guiding roller.

The thermal and mechanical stresses to which the strand-guiding rollers, and thus also the roller bearings, are exposed are very high. For this reason alone, the roller bearings wear relatively quickly. Furthermore, insufficient cooling and/or lubrication of the roller bearings can lead to increased wear on the roller bearings. For proper operation of the continuous casting line, however, it must be ensured that the roller bearings of all the continuous casting rollers are in a functional condition. If damage occurs even to only one roller bearing, this has a negative impact on the continuous casting process.

For example, a freely rotating strand-guiding roller—that is, a strand-guiding roller that is not driven—can become blocked so that its outer surface does not roll off with the metal strand, but instead the metal strand is pulled over the no longer rotating strand-guiding roller. This results at least in increased friction forces, which in turn require increased power consumption by the driven strand-guiding rollers. The consequence is seen at least in higher energy costs, and often higher wear on the roller bearings of the driven strand-guiding rollers. If a number of non-driven strand-guiding rollers become blocked, it can even result in slippage between the driven strand-guiding rollers and the metal strand. This can lead to errors in the tracking of the metal strand. As long as this error goes unnoticed, the actual extraction speed of the metal strand no longer matches a corresponding nominal speed. Incorrect calculations in all process models which use the extraction speed of the metal strand will therefore work incorrectly. Examples of such process models are the continuous cooling and the determination of the temperature of the metal strand as it leaves the continuous casting line. The result is a metal strand of inferior quality, in extreme cases even scrap.

If the speeds of the metal strand and the strand-guiding rollers are different, this will continue to lead both to increased wear on the outer surfaces of the strand-guiding rollers and to surface defects of the metal strand. The consequence is again seen in higher wear on the strand-guiding rollers and lower quality of the metal strand. The surface defects of the metal strand must be eliminated, for example by manual post-processing. In extreme cases, the metal strand cannot be used and must be melted down again.

If the speeds are different between the metal strand and the strand-guiding rollers, the consequences can be even more severe. For example, due to the increased mechanical forces, a roller bearing of a strand-guiding roller may break, causing the corresponding strand-guiding roller to collapse due to the lack of support from the broken roller bearing. As a result, there will be no support for the metal strand in this section of the strand guide. In extreme cases, this can lead to a casting breakdown. The situation is even worse if the forces exerted on the metal strand when a strand-guiding roller is blocking are so high that the strand shell ruptures. Then, the still liquid core escapes and considerable damage to the plant results. Personal injury can also occur.

Another problem with a blocking strand-guiding roller is that in this case a certain region of the strand-guiding roller is permanently in direct contact with the hot metal strand. This will cause local overheating of the strand-guiding roller in this region of the strand-guiding roller. This results in increased wear and ultimately in failure of the strand-guiding roller itself.

Early and timely detection of wear on the roller bearings can prevent or at least minimize all these problems. Damage caused to a roller bearing can theoretically be detected by an inspection. However, inspection is not feasible in practice, as the roller bearings are not accessible even during production stoppages of the continuous casting line.

Damage to a roller bearing can also be detected from the behavior of the strand-guiding roller during its rotation. However, no methods for doing this are known in the prior art.

In JPS57209761 A, a method is disclosed for detecting non-rotating support rollers in a continuous casting line.

A portable vibration meter is disclosed in DE 102010056466 A1.

In EP 0982579 A1 a bearing inspection device is disclosed which is used for inspecting a bearing of a main motor of rolling stock.

SUMMARY OF THE INVENTION

The object of the present invention is to create means for reliably detecting damage to a roller bearing of a strand-guiding roller during the operation of the continuous casting line and thus during the rotation of the strand-guiding roller.

On the one hand, the object is achieved by a strand-guiding section of a continuous casting line as claimed. Advantageous embodiments of the strand-guiding section are the subject matter of the dependent claims.

According to the invention, a strand-guiding section of a continuous casting line of the aforementioned type is designed in such a way that the strand-guiding section has at least one sensor device, which in turn has at least one vibration sensor that is acoustically coupled to the strand-guiding roller or its roller bearings, and by means of which the vibrations occurring when the strand-guiding roller is rotated in the roller bearings can be detected, and the sensor device has an interface, via which the vibration data derived from the detected vibrations can be transmitted to an evaluation device.

The strand-guiding sections are often designed as roller segments. In this case, the strand-guiding section has at least two groups of strand-guiding rollers, each of which contains a plurality of strand-guiding rollers. The strand-guiding rollers of a given group are positioned on the same side of the cast metal strand. The groups are also arranged facing each other in pairs, so that the cast metal strand passes between the two opposing groups. Each roller segment can have up to 20 pairs of rollers. Continuous casting lines can have 10 or more such roller segments.

The format of the cast metal strand can be chosen as required. It can be a slab format, a billet format, or another format. The metal of which the metal strand is made is often steel. It can also be a different metal, such as aluminum.

The strand-guiding roller can be either driven or not driven as required. In the latter case, the strand-guiding roller rotates freely. If the strand-guiding section has a plurality of strand-guiding rollers, at least one of the strand-guiding rollers of the strand-guiding section is typically driven and at least one other of the strand-guiding rollers is not driven. This is not essential, however.

The roller bearings—i.e. the bearings in which the strand-guiding roller is mounted—are usually anti-friction bearings, for example ball bearings or roller bearings. In theory, however, a design as a sliding bearing is also conceivable. The number of roller bearings per strand-guiding roller is at least two. Usually the number is three, but in some cases it is greater than three, for example four.

The vibration sensor can be a sound sensor, in particular an ultrasound sensor. It is possible that the vibration sensor can detect acoustic vibrations in the audible range (approx. 20 Hz to approx. 20 kHz). However, it may also be possible to detect acoustic vibrations that are not in the audible range but, for example, in the ultrasonic range above 20 kHz. The term "acoustic" thus characterizes the type of vibration signal detected, but not its frequency.

The sensor device preferably transmits the vibration data digitally to the evaluation device. If necessary, the sensor device can also amplify the still analog sensor signals before digitizing them. Furthermore, the sensor device can apply a filtering operation before or after digitization, such as high-pass filtering, low-pass filtering, level limiting, and others. However, in terms of the information content, the vibration data matches the acquired sensor signals.

The sensor device is usually a single assembly. Thus, it has a housing in which all the components of the sensor device are arranged—i.e. the vibration sensor itself, the interface, a filter unit if present, and others. On the other hand, the sensor device generally does not have any components that are movable in relation to each other.

The strand-guiding roller is internally cooled by means of supplied cooling water. The vibration sensor is acoustically coupled to the strand-guiding roller and/or to the roller bearings via the cooling water. This enables a very reliable detection of the vibrations that occur when the strand-guiding roller is rotated in the roller bearings. In the case of the direct coupling to the cooling water—i.e. in the case that the vibration sensor detects a vibration propagating in the cooling water directly via contact with the cooling water—the vibration sensor can be designed in particular as a hydrophone. For example, the vibration sensor can be an ultrasound sensor. For example, the ultrasound sensor can be a piezoelectric or a capacitive ultrasound sensor. However, it is also conceivable to use electrodynamic sensors. The vibration sensors should have a frequency range from 500 Hz to at least 5 kHz, preferably up to at least 10 kHz, particularly preferably up to at least 20 kHz, and most particularly preferably up to at least 50 kHz. The vibration sensors should be suitable for providing reliable measurement results in a temperature range from 25° C. to at least 50° C., preferably up to 70° C. Furthermore, the vibration sensors used should be capable of operating at a pressure of up to 8 bar, preferably up to 10 bar, and should be suitable for long-term application in cooling water.

Typically, the strand-guiding roller is additionally cooled externally by the strand cooling system. However, this is of secondary importance in the context of the present invention.

If the strand-guiding roller is cooled internally with cooling water, the strand-guiding roller will usually have a rotary feed-through on at least one end for supplying and/or discharging the cooling water. In this case, supply lines for supplying and/or discharging the cooling water are connected to the strand-guiding roller via the rotary feed-through. In this case, the vibration sensor is preferably arranged on the rotary feed-through. This allows the vibration sensor to be arranged at a relatively easily accessible location. If the sensor device is designed as an assembly, it goes without saying that not only the vibration sensor itself, but the entire sensor device will be arranged on the rotary feed-through.

Normally, a rotary feed-through is arranged at both ends of the strand-guiding roller, wherein the cooling water is supplied to the strand-guiding roller via one rotary feed-through and the cooling water is discharged from the strand-guiding roller via the other rotary feed-through. In this case, the vibration sensor can be positioned on one or the other rotary feed-through as required. It is also possible for two vibration sensors to be provided, with one of the two vibration sensors arranged on one rotary feed-through and the other vibration sensor on the other rotary feed-through. If the sensor devices are designed as assemblies, it goes without saying that not only the vibration sensor itself, but the entire sensor device will be arranged on the rotary feed-through.

Preferably, the interface to the evaluation device is designed as a wireless interface, in particular as a radio interface, and the sensor device also has a separate, internal energy source. The power supply to the sensor device is thus provided independently. The energy source can be designed, for example, as a battery, as an accumulator, or as a device with so-called energy harvesting. Combinations of these measures are also possible. Due to the design of the interface to the evaluation device as a wireless interface and due to the sensor device having a separate, internal energy source, no cables need to be laid to the sensor device. Instead, the sensor device only needs to be installed as is.

Preferably, it is provided
that the sensor device is designed in such a way that it transfers from a passive state to an activated state due to an internally monitored timeout or due to an activation command received via the interface, and transfers from an activated state into the passive state due to an internally monitored timeout or a passivation command received via the interface, and
that the vibration sensor detects the vibrations that occur when the strand-guiding roller is rotated only when the sensor device is in the activated state.

This both limits the volume of data that is generated and minimizes the energy consumption of the sensor device. The latter is particularly important if the sensor device has an internal, autonomous energy source, i.e. is not supplied with power via cables. This significantly extends the required service life of the sensor device until the battery needs to be replaced or the accumulator needs to be recharged.

In particular, in the event of a transition to the passive state due to a timeout, the duration of the respective activation may be specified by the sensor device itself. This applies regardless of whether the activation is due to an internally monitored timeout or to an activation command. In the latter case, receiving the activation command can start an internal timer of the sensor device, wherein the expiry of the timer triggers the transition to the passive state. The duration of each activation is preferably greater than 1 minute and usually less than 10 minutes. In particular, it can be between 2 and 6 minutes, for example 3 or 4 minutes. Such periods correspond to several revolutions of the strand-guiding roller for a typical strand extraction speed and a typical diameter of the strand-guiding roller. The time interval between successive activations of the sensor device, on the other hand, is generally much greater. For example, it may be 1 hour or even longer, such as 10 hours, 12 hours, or one day. Of course, the periods mentioned are only examples.

If both the transition to the activated state and the transition to the passive state are made based on a respective command received via the interface, the times at which the sensor device is activated are specified externally. In this case, the evaluation device (or another device that transmits the commands) should observe appropriate times.

Preferably, the vibration sensor detects the vibrations that occur during rotation of the strand-guiding roller with a sampling rate that is at least in the two-digit kHz range. This enables reliable detection of all relevant frequencies. For example, the sampling can be performed at 20 kHz, 50 kHz or more, in particular at 100 kHz or more. On the other hand, sampling at 100 kHz is usually quite sufficient. Higher sampling rates are therefore possible, but are usually not required.

The object is also achieved by a determination system as claimed. Advantageous embodiments of the determination system are the subject matter of the dependent claims.

According to the invention, a determination system of the aforementioned type is designed in such a way that
the determination system has at least one sensor device, which in turn has at least one vibration sensor which can be acoustically coupled to the strand-guiding roller or the roller bearings thereof via the cooling water, wherein the vibration sensor is designed in such a way that it can detect vibrations propagating in the cooling water which occur when the strand-guiding roller is rotated in the roller bearings, by direct contact of the vibration sensor with the cooling water,
the sensor device has an interface, via which the sensor device transmits vibration data derived from the detected vibrations to an evaluation device of the determination system, and
that the evaluation device, by evaluating the vibration data transmitted to it, determines the status of the at least one roller bearing.

For example, the vibration sensor can be an ultrasound sensor. For example, the ultrasound sensor can be a piezoelectric or a capacitive ultrasound sensor. However, it is also conceivable to use electrodynamic sensors. The vibration sensors should have a frequency range from 500 Hz to at least 5 kHz, preferably up to at least 10 kHz, particularly preferably up to at least 20 kHz, and most particularly preferably up to at least 50 kHz. The vibration sensors should be suitable for providing reliable measurement results in a temperature range from 25° C. to at least 50° C., preferably up to 70° C. Furthermore, such vibration sensors should be capable of operating at a pressure of up to 8 bar, preferably up to 10 bar, and should be suitable for long-term application in cooling water.

The evaluation device is preferably configured to transmit a message to an operator and/or to a monitoring system at least whenever the evaluation device determines a critical state of the roller bearing during the evaluation. This will allow for action to be taken quickly to eliminate a critical condition. The output to the operator can be provided via a dedicated HMI (=human-machine interface) or via another operating device, such as a smartphone or tablet. The monitoring system can be, for example, a CMS (=condition monitoring system) or an MMS (=maintenance management system), in particular a cCMS or a cMMS (the "c" stands for "computerized").

The evaluation device is preferably configured to store the vibration data and/or the determined status of the at least one roller bearing in a memory in the form of a history. This means that the stored information is available for subsequent evaluations at all times.

When information is stored as a history, newly stored information—in this case, the vibration data and/or states to be stored—is added to the information already stored. However, the information already stored is not deleted, but retained. Furthermore, a relevant timestamp is usually assigned to the data. In the present case, this timestamp may characterize, in particular, the period during which the vibrations underlying the vibration data were recorded. The storage can be local or remote as required, including possibly in a cloud.

Preferably, the evaluation device is configured to take into account operating data of the strand-guiding roller, of the strand-guiding section and/or of the continuous casting line in addition to the vibration data when determining the status of the at least one roller bearing. The evaluation device therefore has an input for operating data. This allows the evaluation to be optimized. The operating data taken into account can be nominal values or actual values, as required.

Examples of suitable operating data are the rotation speed or the circumferential speed of the strand-guiding roller, the latter also corresponding to the extraction speed at which the metal strand is extracted from the continuous casting mold. Other possible operating data of the strand-guiding roller are the pressure and temperature of the cooling water and the lubrication status of the roller bearings. If the strand-guiding section is designed as a roller segment, for example, possible operating data can be the contact pressure exerted by the roller segment on the strand. Possible operating data of the continuous casting line as a whole are, for example, the extraction speed of the metal strand from the continuous casting mold or the casting format.

Preferably, the evaluation device is configured to determine a two-dimensional spectral decomposition of the vibration data transmitted to it, wherein the two dimensions of the spectral decomposition are time and frequency. In this case, the evaluation device can evaluate the spectral decomposition to determine the status of the at least one roller bearing. This type of evaluation leads to particularly reliable results.

Spectral decompositions of this kind are generally known to persons skilled in the art. They involve the (usually complex) spectral analysis of a signal, in this case the detected vibrations or the vibration data derived from them. They can be determined, for example, by means of a short-time Fourier transform. Representations of such spectral decompositions are known to persons skilled in the art under the term "spectrogram".

One possible way of exploiting the spectral decomposition is that the evaluation device determines the highest amplitude for each point in time of the transmitted vibration data, compares each highest amplitude with at least one limit, and determines the status of the at least one roller bearing depending on the comparisons.

For example, if a lower and an upper limit are specified, the following can apply in relation to a single time point: if the maximum amplitude is below a lower limit, the strand-guiding roller is running quietly at this time. The individual result is evaluated as good. If the maximum amplitude is above the lower limit but below an upper limit, the strand-guiding roller is running at a moderately loud level at this time. The individual result is rated as fair. If the maximum amplitude is above the upper limit, the strand-guiding roller is running noisily at this time. The individual result is rated as poor.

The status of the at least one roller bearing is then determined depending on the comparisons from the entire set of the individual evaluations. For example, the evaluation device can determine the status according to the frequency of classification as quiet/good, moderately noisy/fair, or noisy/poor. In this context, particular importance is attached to the "poor" individual evaluations.

It is possible that the at least one limit is constant over time. Alternatively, it can be time-variable, in particular being determined by the evaluation device depending on the operating state of the continuous casting line. This can be used to optimize the determination of the status in some circumstances. For example, different limits can be used for the operating states "start of casting", "constant, stable operating state", "end of casting", "width change of the mold" and others. It is also possible to determine the at least one limit depending on the operating temperature and/or the extraction speed of the metal strand (or an equivalent quantity).

Another possible way of exploiting the spectral decomposition is that the evaluation device is configured to determine the energy content of the spectral decomposition for a plurality of time points and in a number of predetermined frequency bands of the spectral decomposition, and that the evaluation device determines the status of the at least one roller bearing on the basis of the determined energy content values. The evaluation device can determine the energy content, for example, by integrating the spectral decomposition for the respective time point over frequency. The integration limits are the lower and upper limits of the respective frequency band.

Another possible way of exploiting spectral decomposition is that the evaluation device is configured—with or without prior filtering of the energy content values within the respective frequency band—to calculate a mean value of the energy content values and a maximum value of the energy content values for each frequency band and to determine the status of the at least one roller bearing on the basis of the calculated mean values and the calculated maximum values of the frequency bands.

For example, the evaluation device can be configured to form the difference between the maximum value and the mean value within a given frequency band. If this difference is above a predefined limit, this returns a negative individual evaluation. At a minimum, it may be sufficient to perform the evaluation for a single frequency band. However, it is usually carried out for a number of frequency bands. In this case, the evaluation device can determine the status of the roller bearing on the basis of the number of negative individual evaluations. If the number of negative individual evaluations is above an upper limit, the status of the roller bearing is judged to be poor and an alarm is triggered. If the number of negative individual evaluations is above an upper limit, the status of the roller bearing is judged to be good and no alarm is triggered. If the number of negative individual evaluations lies between the two limits, a warning message is output.

Another possible way of exploiting the spectral decomposition is that the evaluation device is configured, for a plurality of frequency bands—with or without prior filtering of the energy content values within the respective frequency band— a) to calculate a mean value of the energy content values and a maximum value of the energy content values,
b) to determine a start time point at which the energy content first exceeds an intermediate value between the mean value and the maximum value,
c) to determine, starting from the determined start time point, an end time point at which the energy content falls below the mean value again for the first time,
d) to determine a resulting time point, between the determined start time point and the determined end time point, at which the energy content is a maximum,
e) starting from the last determined end time point, to repeat steps b) to d) until all the resulting time points within the respective frequency band are determined,
f) to then determine, on the basis of the determined resulting time points, a respective period with which the energy content varies within the respective frequency band, and
g) to determine the status of the at least one roller bearing on the basis of the periods determined for the frequency bands.

The intermediate value can be approximately (or exactly) at the mid-point between the mean value and the maximum value. Equal periods in multiple frequency bands are an indication of damage to the roller bearing.

Another possible way of exploiting the spectral decomposition is that the evaluation device is configured to compare a frequency analysis of the determined energy content values within the frequency bands with a rotation speed of the strand-guiding roller and to determine the status of the at least one roller bearing based on the comparison. The frequency analysis can be determined, for example, by means of a Fourier transformation. The specific frequencies of the frequency analysis with which the energy content values vary can be determined. The stronger the frequency analysis yields components that are periodic with the rotation speed of the strand-guiding roller (fundamental vibration) or integer multiples thereof (harmonics), the greater or the more likely is the damage to the roller bearing.

BRIEF DESCRIPTION OF THE DRAWINGS

The properties, features and advantages of the present invention described above and the manner in which these are achieved will become clearer and more comprehensible in conjunction with the following description of the exemplary embodiments, which are explained in more detail in connection with the drawings. In the drawings, in schematic representation:

FIG. 4 shows a detail of FIG. 3 in an enlarged view,
FIG. 5 shows a block diagram with a sensor device and an evaluation device,
FIG. 6 shows a timing diagram,
FIG. 7 shows a timing diagram,
FIG. 10 shows a flowchart,
FIG. 11 shows a flowchart.

DESCRIPTION OF EMBODIMENTS

Figure 1:
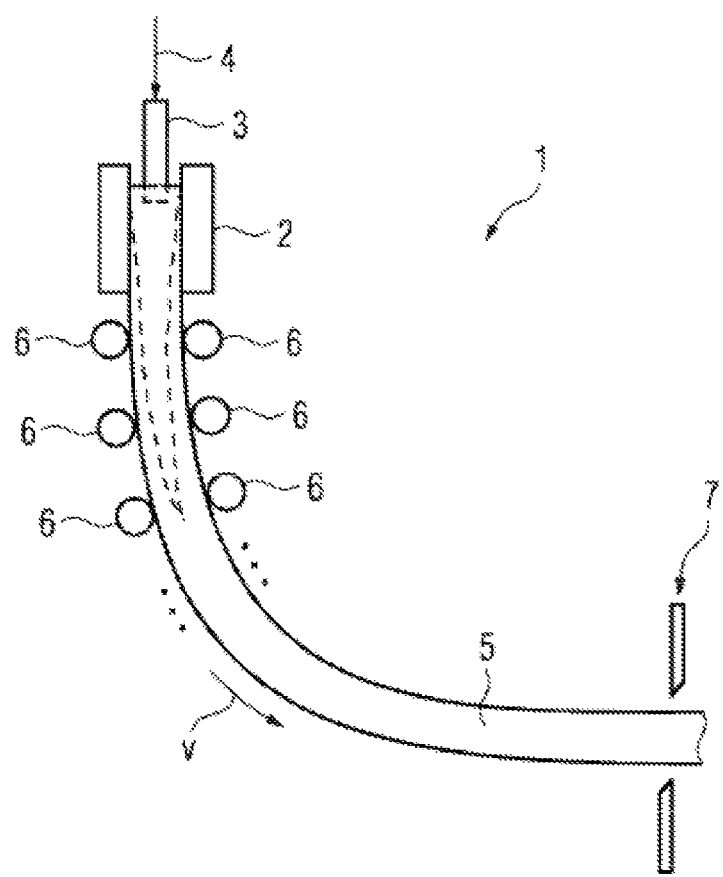
FIG. 1 shows a continuous casting line.

According to FIG. 1, a continuous casting line 1 has a continuous casting mold 2. Liquid metal 4, such as liquid steel, is poured into the continuous casting mold 2—for example via a schematically indicated immersion tube 3. The continuous casting mold 2 determines the format of the metal strand 5. The format can be a slab format, a billet format, or another format.

The liquid metal 4 solidifies on the walls of the continuous casting mold 2 and is extracted from the continuous casting mold 2 as a metal strand 5, which is initially partially solidified and later fully solidified. The metal strand is extracted with an extraction speed v which is generally within the range of a few meters per minute (m/min), for example between 3 m/min and 10 m/min.

The metal strand 5 is supported behind the continuous casting mold 2 in the extraction direction by means of a plurality of strand-guiding rollers 6. In FIG. 1, only a few of the strand-guiding rollers 6 are shown. The strand-guiding rollers 6 in their entirety form a strand guide downstream of the continuous casting mold 2. It is possible for the metal strand 5 to be rolled directly out of the casting melt behind the strand guide. Alternatively, the metal strand 5 can be cut to length, for example by means of a schematically indicated gas cutting machine 7.

Figure 2:
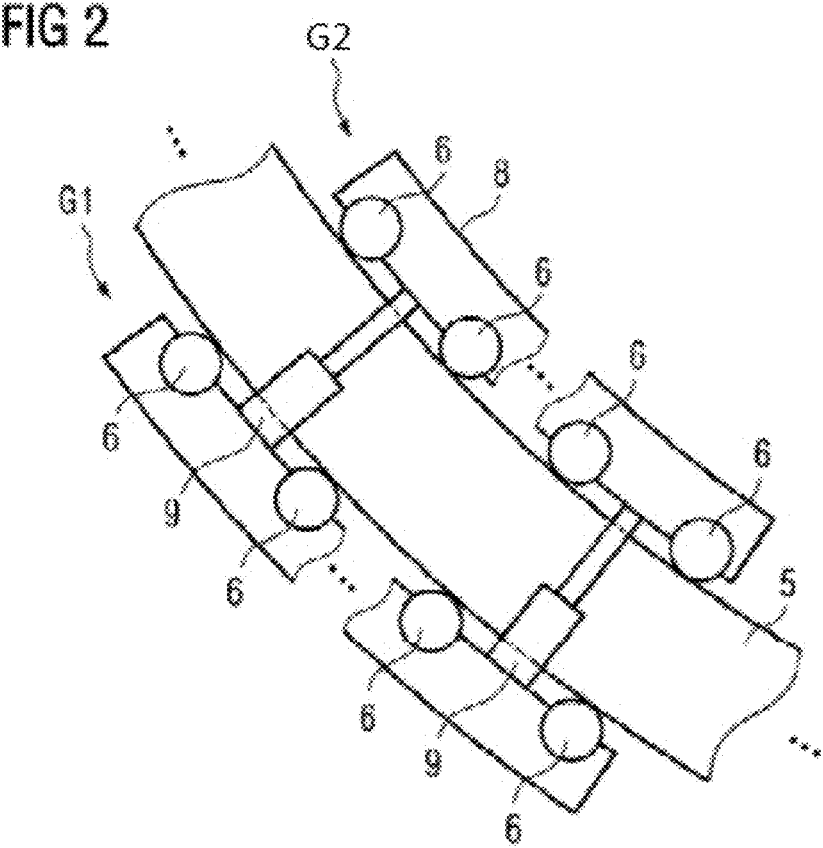
FIG. 2 shows a strand-guiding section.

The strand-guiding rollers 6 are arranged in strand-guiding sections 8 according to the illustration in FIG. 2. The strand-guiding sections 8 are therefore arranged downstream of the continuous casting mold 2, as are the strand-guiding rollers 6 themselves. FIG. 2 shows a typical design of a strand-guiding section 8. In this design, the strand-guiding section 8 is designed as a roller segment. The roller segment has a first and a second group G1, G2 of strand-guiding rollers 6, as can be easily seen from FIG. 2. The two groups G1, G2 of strand-guiding rollers 6 each have a plurality of strand-guiding rollers 6. Furthermore, the strand-guiding rollers 6 of the two groups G1, G2 are adjacent to opposite sides of the cast metal strand 5, where they roll off. In general, the distance between the strand-guiding rollers 6 of the first group G1 and the strand-guiding rollers 6 of the second group G2 can also be adjusted via actuating devices 9. For example, the actuating devices 9 can be designed as hydraulic cylinder units.

Figure 3:
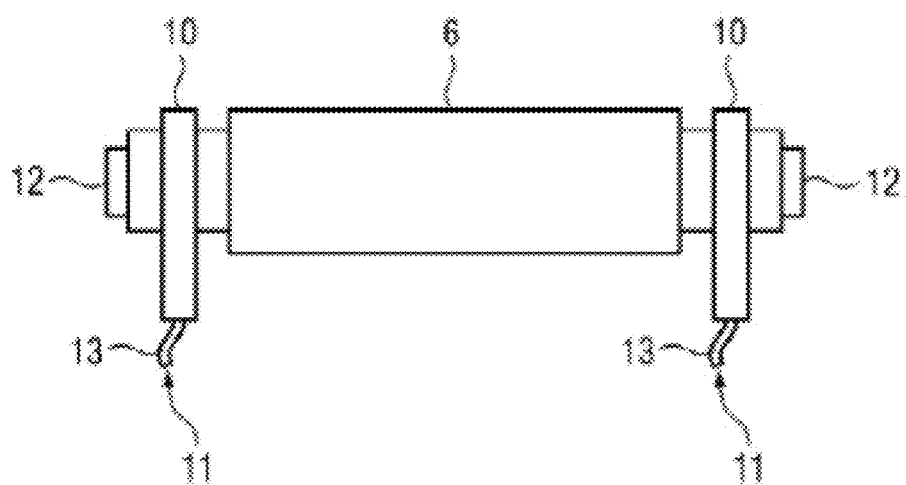
FIG. 3 shows a strand-guiding roller, its mounting and supply lines.

However, regardless of the design of the strand-guiding sections 8 as roller segments, at least one strand-guiding roller 6 is mounted in each strand-guiding section 8, as illustrated in FIG. 3. The strand-guiding rollers 6 are mounted via roller bearings 10. The roller bearings 10 are usually designed as anti-friction bearings.

In many cases the strand-guiding roller 6 is cooled internally by means of cooling water 11, as illustrated in FIG. 3. In this case, the strand-guiding roller 6 can have a rotary feed-through 12 on at least one end. For example, as illustrated in FIG. 3, a rotary feed-through 12 can be arranged at both ends of the strand-guiding roller 6. The rotary feed-throughs 12 are used to supply the cooling water 11 to the strand-guiding roller 6 and/or to discharge the cooling water 11 from the strand-guiding roller 6. Connections to the rotary feed-throughs 12 are made using rigid or flexible supply lines 13, via which the cooling water 11 is supplied to the strand-guiding roller 6 or discharged from the strand-guiding roller 6.

According to the enlarged illustration in FIG. 4, the strand-guiding section 8 has a sensor device 14. The sensor device 14 in turn has a vibration sensor 15, according to the block diagram of FIG. 5. The vibration sensor 15—for example a sound sensor, in particular an ultrasound sensor—is acoustically coupled to the strand-guiding roller 6 or its roller bearings 10. As a result, the vibration sensor 15 is able to detect the vibrations that occur when the strand-guiding roller 6 is rotated in the roller bearings 10. The vibrations can be caused, for example, by impurities on the roller bearings 10. The vibration sensor 15 outputs a sensor signal SS corresponding to the detected vibrations. The sensor signal SS is typically still analog.

The vibration sensor 15 detects the vibrations that occur during rotation of the strand-guiding roller 6 with a sampling rate that is at least in the two-digit kHz range, i.e. 10 kHz or more. According to the illustration in FIG. 6, a sampling time T of a maximum of 100 µs is present between two directly consecutive detections of the respective signal level of the vibrations and the corresponding output of the sensor signal SS. For example, the sampling time T can be 10 µs (equivalent to a sampling rate of 100 kHz) or 20 µs (equivalent to a sampling rate of 50 kHz) or 50 µs (equivalent to a sampling rate of 20 kHz).

As part of the embodiment according to FIG. 3, in which the strand-guiding roller 6 is internally cooled, according to the illustration in FIG. 3 the vibration sensor 15 is acoustically coupled to the strand-guiding roller 6 and/or to the roller bearings 10 via the cooling water 11. The vibration sensor 15 (more precisely: a vibration-sensitive surface of the vibration sensor 15) is thus in direct contact with the cooling water 11, as also indicated schematically in FIG. 5. The cooling water 11 thus acts as the transmission medium for the vibrations. In particular, the vibration sensor 15 can be designed as a hydrophone for good signal acquisition.

The arrangement of the vibration sensor 15 can be selected as required. If (at least) one rotary feed-through 12 is present, the vibration sensor 15 is preferably arranged on the rotary feed-through 12 (or one of the rotary feed-throughs 12). However, it can also be arranged at another location. If the signal is not acquired via the cooling water 11, the vibration sensor 15 can also be arranged at any other location where signal acquisition is possible, including in particular in the immediate vicinity of the roller bearing 10 to be monitored.

The sensor device 14 has additional components, as illustrated in FIG. 5. The most important additional component is an interface 16, via which the sensor device 14 transmits vibration data SD to an evaluation device 17. The vibration data SD is usually digital data that is produced by digitizing the acquired sensor signals SS, for example in an analog-to-digital converter 18. In any case, however, the vibration data SD is data derived from the detected vibrations or the sensor signals SS, the information content of which corresponds to the sensor signals SS. The interface 16 is preferably designed as a wireless interface, in particular as a radio interface.

As an additional component, the sensor device 14 also preferably comprises at least one separate, internal energy source 19. In this case, the sensor device 14 does not require any electrical cables to supply power. A control device 20 is also present, which controls at least the interface 16 and also the other components of the sensor device 14, if present.

It is possible that the sensor device 14 transmits the sensor signal SS—possibly after digitization—to the evaluation device 17 as is, i.e. as vibration data SD. However, the sensor device 14 preferably has additional components. For example, as illustrated in FIG. 5, the sensor device 14 can have a filter 21 in which filtering takes place. The filter 21 can be arranged before or after the analog-to-digital converter 18 in the direction of the signal flow as required. The filtering can be high-pass filtering, low-pass filtering, level limiting, etc., as required. In addition, the sensor device 14 can have an amplifier 22. The amplifier 22 amplifies the analog sensor signal SS—preferably before any filtering, but in any case before the analog-to-digital conversion.

According to the illustration in FIG. 7, the sensor device 14 is only temporarily active. For example, the sensor device 14 can transfer from a passive state OFF to an activated state ON whenever it receives an activation command A via the interface 16—see FIG. 5. Alternatively, it is possible that the sensor device 14—see also FIG. 5—has an internal timer 23 and transfers to the activated state ON whenever the timer 23 signals the expiry of a specific time period T'. In this case, the transition to the activated state ON is based on an internally monitored timeout, so that the sensor device 14 activates itself.

The sensor device 14 maintains the activated state for a certain time period T". The time period T" is usually in the single-digit minute range, for example, between 3 minutes and 8 minutes. The sensor device 14 then transfers from the activated state ON back to the passive state OFF. For example, the timer 23 can be used to monitor the expiry of the time period T". In this case, the transition to the passive state OFF is thus based on an internally monitored timeout, so that the sensor device 14 deactivates itself. As an alternative possibility, the sensor device 14 transfers to the passive state OFF whenever it receives a passivation command P via the interface 16. In this case, the device which transmits the passivation command P to the sensor device 14 must ensure that the time period T" is observed. This device can be, for example, the evaluation device 17.

The time period T" during which the sensor device 14 is activated is usually considerably shorter than the time period T' between two directly consecutive activations. For example, the time period T' can be 1 hour or more, or several hours and even several days.

It is also clear from FIG. 7 that the vibration sensor 15 detects the vibrations occurring when the strand-guiding roller 6 is rotated only when the ON state of the sensor device 14 is activated. If an immediate transmission to the evaluation device takes place, the same applies to the transmission of the vibration data SD derived from the sensor signals SS to the evaluation device 17 via the interface 16.

The evaluation device 17 evaluates the vibration data SD which the sensor device 14 transmits to it. As part of this evaluation, the evaluation device 17 determines the status Z of the at least one roller bearing 10 of the strand-guiding roller 6. Possible procedures for determining the status Z will be explained in detail later. However, it should be mentioned immediately that when determining the status Z, the evaluation device 17 can take into account operating data of the strand-guiding roller 6, of the strand-guiding section 8 and/or the continuous casting line 1 as a whole, in addition to the vibration data SD. This will become apparent from the explanations of the possible forms of evaluation to be given below.

As illustrated in FIG. 5, the evaluation device 17 transmits a message M to an operator 24 and/or a monitoring system 25 at least whenever it determines a critical status of the roller bearing 10 during the evaluation. It is therefore possible that the evaluation device 17 also outputs a message M to the operator 24 and/or the monitoring system 25 if the determined status Z of the roller bearing 10 is not critical. However, in this case the transmission of the message M can also be omitted. If, on the other hand, the determined status Z is critical, the evaluation device 17 always outputs the message M.

In addition, the evaluation device 17 can store the vibration data SD in a storage device 26, in accordance with FIG. 5. The data is stored in the form of a history. Newly stored vibration data SD are thus added to the already stored vibration data SD, but do not replace it. Furthermore, time information is associated with the stored data, in particular time information for the acquisition of the vibration data. Additional data may be added, for example, about the type of evaluation or the time at which the evaluation is carried out. As an alternative or in addition to the vibration data SD, the evaluation device 17 can also store the determined state Z and, if applicable, other data in the storage device 26 in the same way. An example of other data that can be meaningfully stored is an acknowledgment by the operator 24, with which the operator 24 or the monitoring system 25 acknowledged a reported critical status.

Figure 8:
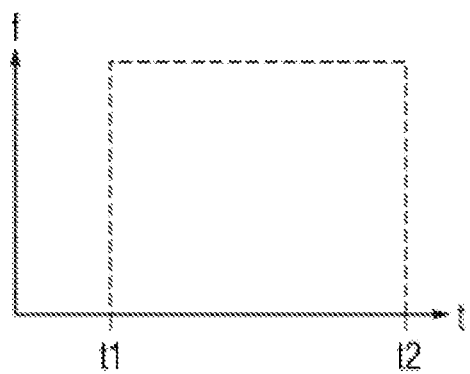
FIG. 8 shows a frequency-time component diagram.

As part of the evaluation of the determined vibration data SD, the evaluation device 17 first determines a two-dimensional spectral decomposition FZ of the vibration data SD. It thus determines a two-dimensional field in which, according to the illustration in FIG. 8, the two dimensions of the spectral decomposition FZ—i.e. the input variables of the spectral decomposition FZ—are the time t and the frequency f, and in which the output variable indicates the proportion of the vibration data SD which is present at the respective frequency f at the respective time t.

On the time axis, the spectral decomposition FZ extends from a start time t1 to an end time t2. The start time t1 and the end time t2 are the times during which the sensor signals SS are detected by the vibration sensor 15 during a given activation. The extension on the frequency axis can be chosen as required. The proportion determined as a function of time t and frequency f can be a complex value or—equivalent thereto—a pair of real values—or a single real value.

Figure 9:
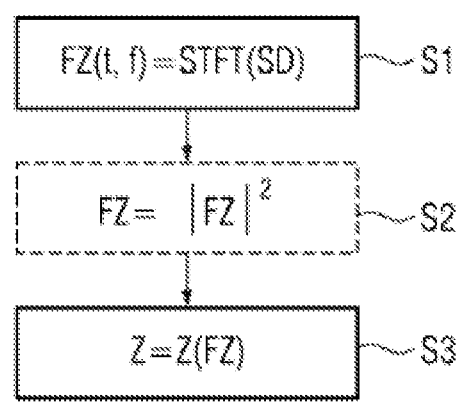
FIG. 9 shows a flowchart.

In order to determine the spectral decomposition FZ, the evaluation device 17 can perform a short-time Fourier transformation of the vibration data SD in a step S1, for example, in accordance with the illustration in FIG. 9. The short-time Fourier transform first yields the complex components (or, equivalent to this, the division into sine and cosine functions for equal frequencies). In addition, the evaluation device 17 can then determine real components on the basis of the complex components in step S2. In particular, it can determine the magnitude or the square of the magnitude of the respective complex component. In this case, the spectral decomposition FZ directly specifies the energy content E for the respective time point t and the respective frequency f. In step S3, the evaluation device 17 then evaluates the spectral decomposition FZ. This evaluation is used to determine the status Z of the at least one roller bearing 10. Means for implementing step S3 of FIG. 9 are explained below in conjunction with the other figures.

Step S2 is optional and therefore only shown with a dashed line in FIG. 9. As a rule, however, step S2 is included. It is also assumed throughout the following text that the spectral decomposition FZ is performed according to steps S1 and S2, so that the resulting spectral decomposition FZ already delivers the square of the magnitude of the short-time Fourier transformation.

In a possible configuration of step S3 of FIG. 9, the evaluation device 17 can determine the maximum MAX of the spectral decomposition FZ in step S11, as illustrated in FIG. 10, for example. In this case, in step S12 the evaluation device 17 compares the determined maximum MAX with a lower limit LIM1. If the maximum MAX is below the lower limit LIM1, in step S13 the evaluation device 17 sets the status Z to the value "good", symbolized by "+" in FIG. 10. Optionally, the evaluation device 17 can output a corresponding message M in a subsequent step S14. On the other hand, if the maximum MAX is above the lower limit LIM1, the evaluation device 17 proceeds to step S15. In step S15, the evaluation device 17 compares the determined maximum MAX with an upper limit LIM2. The upper limit LIM2 is, self-evidently, larger than the lower limit LIM1. If the maximum MAX is below the upper limit LIM2, the evaluation device 17 sets the status Z to the value "fair" in step S16 (symbolized by "0" in FIG. 10) and outputs a corresponding message M in step S17. If the maximum MAX is above the upper limit LIM2, the evaluation device 17 sets the status Z to the value "poor" in step S18 (symbolized by "-" in FIG. 10) and outputs a corresponding message M in step S19.

The lower limit LIM1 and the upper limit LIM2 are suitably chosen. For example, they can be determined and specified based on experiments. It is also possible that the lower limit LIM1 and/or the upper limit LIM2 are time-variable. For example, as illustrated in FIG. 11, the evaluation device 17 can receive an operating state BZ of the continuous casting line 1 in step S21 before carrying out steps S11 to S19, and determine the lower limit LIM1 and/or the upper limit LIM2 depending on the operating state BZ of the continuous casting line 1 in step S22.

The example above, in which a lower and an upper limit LIM1, LIM2 are defined, is purely exemplary. Only one limit can also be specified. More than two limits can also be specified.

Figure 12:
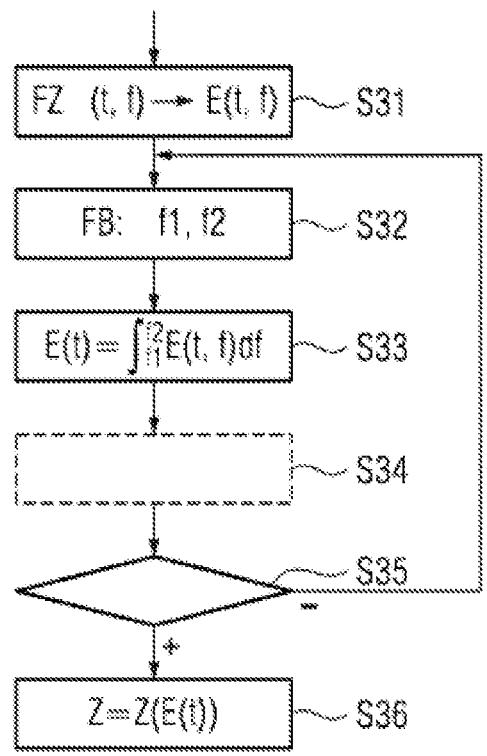
FIG. 12 shows a flowchart.

In a further possible configuration of step S3 of FIG. 9, the evaluation device 17 can determine an energy content E of the spectral decomposition FZ in step S31, as illustrated in FIG. 12. In the simplest case, step S31 is trivial because the determination of the energy content E was already the object of step S1. Otherwise, it must be carried out explicitly. If, for example, the evaluation device 17 determines the (complex) component in step S1, in step S31 the square of the magnitude of the component (or the product of the component with the complex conjugate of the component) is determined. However, the determination in step S31 is always resolved in both dimensions (i.e. both in time t and frequency f).

In step S32, the evaluation device 17 selects a predefined frequency band FB. The selected frequency band FB extends from a lower cutoff frequency f1 to an upper cutoff frequency f2. For the sake of clarity, it is pointed out here that the term "cutoff frequency" in the context of the present invention has nothing to do with signal filters and the corresponding cutoff frequencies. The term "cutoff frequency" refers only to the lower or upper limit of the frequency band FB.

In a subsequent step S33, the evaluation device 17 determines the energy content of the selected frequency band FB as a function of time t. It thus forms the integral of the energy content E over the frequency f from the lower cutoff frequency f1 to the upper cutoff frequency f2. Since, as already mentioned, it is assumed within the context of the present invention that the spectral decomposition FZ directly specifies the energy content for the respective time point t and the respective frequency f, the integral of the spectral decomposition FZ itself can be formed in step S33.

In an optional step S34, the evaluation device 17 can then filter the determined energy content E, in particular, perform a temporal averaging. If the filtering is carried out, the filtering is based on a considerably shorter period than the period for which the vibration data SD was acquired and hence for which the spectral decomposition FZ is also determined. For example, if the difference between the end time t2 and the start time t1 is 5 minutes, filtering can occur for a time frame of 1 second, for example. The numerical values mentioned are purely exemplary, but show the principle.

In step S35, the evaluation device 17 checks whether it has performed step S33 and, if applicable, step S34 for all frequency bands FB. If this is not the case, the evaluation device 17 returns to step S32. In the repeated execution of step S32 the evaluation device 17 selects a different frequency band FB for which it has not yet performed step S33 and step S34, if applicable.

Otherwise, the evaluation device 17 proceeds to step S36, in which the further evaluation is carried out. This evaluation is based on the previously determined energy content values E. In particular, the evaluation device 17 in step S36 uses not only the energy content E determined during the last execution of step S33, but also the energy content values E determined for all frequency bands FB.

Figure 13:
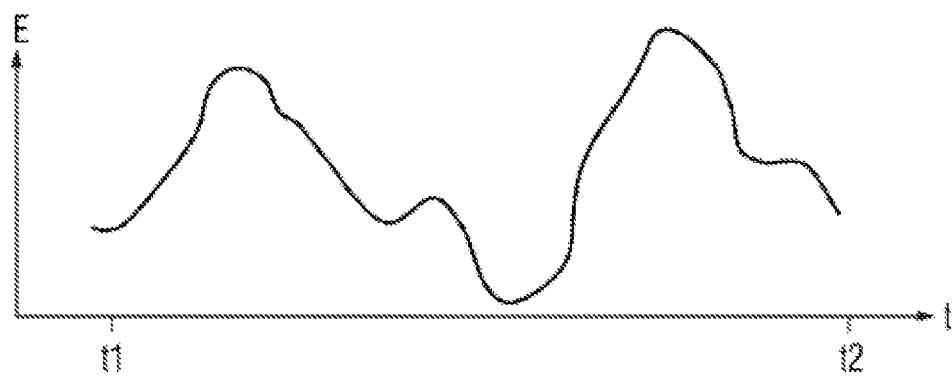
FIG. 13 shows a temporal characteristic of an energy content.

The procedure according to FIG. 12 returns the temporal characteristic of the energy content E for each of the frequency bands FB. A possible temporal characteristic is shown in FIG. 13 for a single frequency band FB.

The number of frequency bands FB for which the energy content E is determined as a function of time t can be determined as required. At a minimum, only a single frequency band FB is used. As a rule, however, the energy content E is determined for a plurality of frequency bands FB. The number of frequency bands FB is usually between three and eight. If the energy content E is determined for a plurality of frequency bands FB, the frequency bands FB are usually additionally separate from each other (disjoint). This means that they do not overlap. If, purely as an example, one of the frequency bands FB extends from a lower cutoff frequency f1 of 100 Hz to an upper cutoff frequency f2 of 200 Hz, this frequency range is, so to speak, a prohibited zone for all other frequency bands FB. A different frequency band FB that has an upper cutoff frequency f2 above 200 Hz—for example, 500 Hz—can thus have a lower cutoff frequency f1 of, for example, 300 Hz. The lower cutoff frequency f1 of this other frequency band FB can also be less than 300 Hz. Under no circumstances though should the cutoff frequency f1 of this other frequency band FB be less than 200 Hz. However, the limiting case in which the upper cutoff frequency f2 of a frequency band FB is equal to the lower cutoff frequency f1 of another frequency band FB is still just permissible.

In a concrete implementation of the present invention, experiments were carried out with four frequency bands FB. In this experiment, one frequency band FB ranged from 7 kHz to 11 kHz, another frequency band FB from 11 kHz to 15 kHz, another frequency band FB from 30 kHz to 37 kHz, and another frequency band FB from 42 kHz to 49 kHz. The first and the second frequency bands FB mentioned are therefore exactly adjacent to each other, while the second frequency band FB and the two other frequency bands FB are separated from each other.

Possible implementations of step S36 are explained below in conjunction with the remaining figures.

Figure 14:
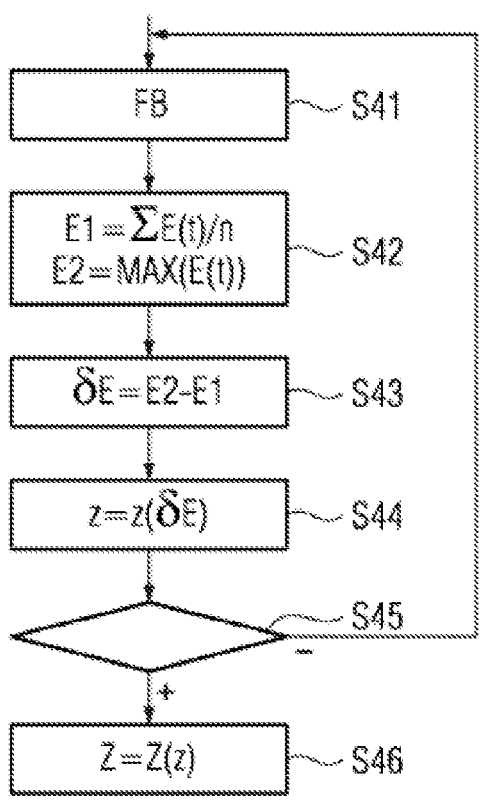
FIG. 14 shows a flowchart.

In a further possible configuration of step S36 of FIG. 12, the evaluation device 17 can select one of the frequency bands FB in step S41, as illustrated in FIG. 14. Within the selected frequency band FB, the evaluation device 17 determines a mean value E1 of the energy content values E and a maximum value E2 of the energy content values E in step S42. In a step S43, the evaluation device 17 forms the difference 5E between the maximum value E2 and the mean value E1 of the energy content values E. In step S44, the evaluation device 17 then determines a preliminary status z for the selected frequency range FB. This determination is based on the difference 5E. For example, in step S44, the evaluation device 17 may determine the value "good" as the preliminary status z if the difference 5E is below a predetermined limit, and otherwise determine the value "poor" as the preliminary status z. The pre-determined limit can be relatively small. In particular, it can be between 1% and 10% of the mean value E1, for example between 2% and 5%.

In step S45, the evaluation device 17 checks whether it has performed steps S42 to S44 for all frequency bands FB. If this is not the case, the evaluation device 17 returns to step S41. In the repeated execution of step S41 the evaluation device 17 selects a different frequency band FB for which it has not yet performed steps S42 to S44.

Otherwise, the evaluation device 17 proceeds to step S46, in which the further evaluation is carried out. In particular, in step S46 the evaluation device 17 determines the status Z using the preliminary statuses z. For example, it is possible that as the status Z the evaluation device 17 determines the value "good" if a sufficient number—in particular all—of the preliminary statuses z are "good",
the value "poor" if a sufficient number—in particular all—of the preliminary statuses z are "poor", and
otherwise, the value "fair".

Other procedures are also possible, for example, that the status Z is determined solely on the basis of the number of poor preliminary statuses z. It is also possible to determine exclusively the value "good" or the value "poor" as the status Z.

Figure 15:
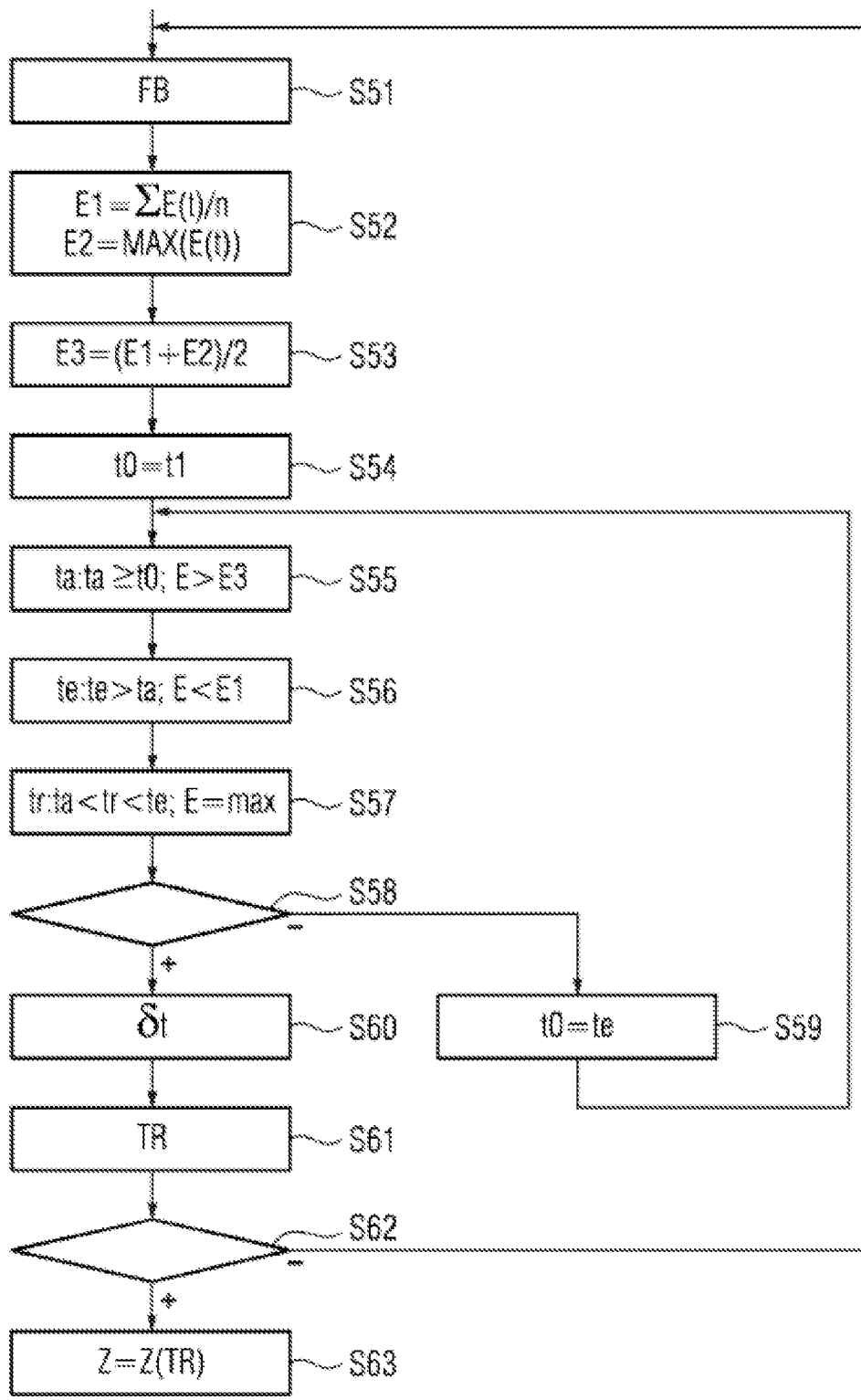
FIG. 15 shows a flowchart.

In a further possible configuration of step S36 of FIG. 12, the evaluation device 17 can select one of the frequency bands FB in step S51—analogous to step S41 of FIG. 14—as illustrated in FIG. 15. Within the selected frequency band FB, in step S52—analogous to step S42 of FIG. 14—the evaluation device 17 determines a mean value E1 of the energy content values E and a maximum value E2 of the energy content values E. In step S53, the evaluation device 17 determines an intermediate value E3 between the maximum value E2 and the mean value E1 of the energy content values E. For example, the evaluation device 17 can form the sum of maximum value E2 and mean value E1 and divide this sum by 2.

The evaluation device 17 then analyzes the temporal characteristic of the determined energy content values E. In concrete terms, the evaluation device 17 sets a start time point t0 to the start time t1 in a step S54. In step S55, the evaluation device 17 then determines a start time point ta. The start time point ta is the time point at which, starting from the start time point t0, the energy content E exceeds the intermediate value E3 for the first time. Starting from the determined start time point ta, the evaluation device 17 then determines an end time point te in step S56. The end time point te is the time point at which, starting from the start time point ta, the energy content E falls below the mean value E1 again for the first time. The evaluation device 17 then determines a resulting time point tr in step S57. The resulting time point tr is the time point that lies within the time interval from the start time point ta to the end time point te and has the maximum energy content E within this time interval.

In step S58, the evaluation device 17 checks whether it should repeat steps S55 to S58, starting from the previous end time point te as the new start time point ta. If this is the case, the evaluation unit 17 proceeds to step S59. In step S59, the evaluation device 17 sets the previous end time point te as the new start time point ta. It then returns to step S55. At the end of the process, all the resulting time points tr within the respective frequency band FB are thereby determined.

When the determination of the resulting time points tr for the frequency band FB currently being analyzed is complete, the evaluation device 17 proceeds to step S60. In step S61, the evaluation device 17 determines the time intervals δt between directly consecutive resulting time points tr. Based on the time intervals δt, the evaluation device 17 then determines a period TR for the resulting time points tr in step S62. For example, the evaluation device 17 can form the mean value of the time intervals δt and treat this mean value as the period TR. The evaluation device 17 can therefore assume that the energy content E within the selected frequency band FB varies on average with the period TR.

In step S62, the evaluation device 17 checks whether it has already performed steps S52 to S61 for all frequency bands FB. If this is not the case, the evaluation device 17 returns to step S51. In the repeated execution of step S51 the evaluation device 17 selects a different frequency band FB for which it has not yet performed steps S52 to S61.

Otherwise, the evaluation device 17 proceeds to step S63 in which the further evaluation is carried out. This evaluation is based on the previously determined periods TR. In particular, it is to be expected that the poorer the status Z of the roller bearing 10, the more consistent are the determined periods TR. The evaluation device 17 can therefore check, for example, how close to each other the periods TR determined for the different frequency bands FB are located. If the determined periods TR are close to each other, the status Z is assigned the value "poor". If the determined periods TR are far apart, the status Z is assigned the value "good". If neither case is present, the status Z is assigned the value of "fair".

Figure 16:
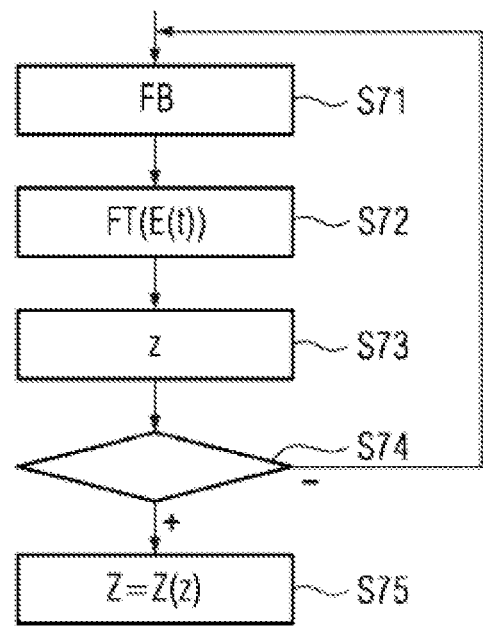
FIG. 16 shows a flowchart.
Figure 17:
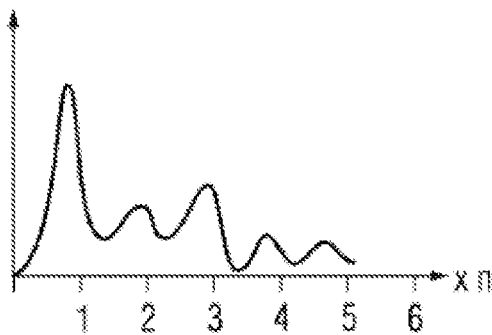
FIG. 17 shows a Fourier-transformed signal.
Figure 18:
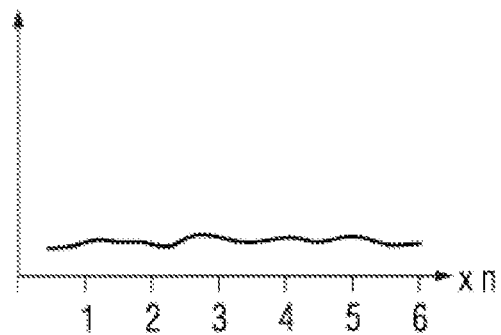
FIG. 18 shows another Fourier-transformed signal.

In a further possible configuration of step S36 of FIG. 12, the evaluation device 17 can select one of the frequency bands FB in step S71—analogous to step S41 of FIG. 14—as illustrated in FIG. 16. Within the selected frequency band FB, the evaluation device 17 performs a frequency analysis of the determined energy content E in step S72. For example, in step S72 the evaluation device 17 can calculate a Fourier transformation of the energy content E. FIG. 17 and FIG. 18 show purely exemplary possible results of such a Fourier transformation, i.e. the Fourier transform of possible energy content values E of a frequency band FB. The numbers entered on the abscissa are normalized to the rotation speed of the strand-guiding roller 6 in question and are therefore expressed in terms of the rotation speed of the strand-guiding roller 6 under analysis.

If, as shown in FIG. 17, appreciable amplitudes occur at the rotation rate of the strand-guiding roller 6 in question and integer multiples thereof, this can be interpreted as an indication that the status Z of the roller bearing 10 is poor. The value "poor" can therefore be assumed as the preliminary status z for the frequency band FB in question, provided that such appreciable amplitudes occur. If, on the other hand, as shown in FIG. 18, no appreciable amplitudes are present, the value "good" can be assumed as the preliminary status z for the frequency band FB in question. The evaluation device 17 can therefore determine the corresponding components in step S73, compare the components with limit values, and determine the preliminary status z for the selected frequency band FB depending on the comparison.

In step S74, the evaluation device 17 checks whether it has already performed steps S72 and S73 for all frequency bands FB. If this is not the case, the evaluation device 17 returns to step S71. In the repeated execution of step S71 the evaluation device 17 selects a different frequency band FB for which it has not yet performed steps S72 and S73.

Otherwise, the evaluation device 17 proceeds to step S75 in which the further evaluation is carried out. In particular, in step S75 the evaluation device 17 determines the status Z using the preliminary statuses z. For example, it is possible that, analogous to step S46 of FIG. 14, the evaluation device 17 determines as the status Z the value "good" if a sufficient number—in particular all—of the preliminary statuses z are "good", the value "poor" if a sufficient number—in particular all—of the preliminary statuses z are "poor", and otherwise, the value "fair".

Here, also, different procedures are possible, analogous to FIG. 14. In particular, the status Z can be determined exclusively based on the number of poor preliminary statuses z.

The present invention has been explained above in conjunction with a single sensor 15 and a single sensor device 14. However, the present invention can also be embodied if a plurality of sensors 15 and/or a plurality of sensor devices 14 are present for a single strand-guiding roller 6. The present invention is also quite generally embodied for all strand-guiding rollers 6. Furthermore, the invention has been explained in connection with an embodiment in which the vibration data SD is transmitted to the evaluation device 17 immediately after the sensor signals SS have been acquired. It is also conceivable, however, to store the vibration data SD within the sensor device 14 first and only transmit them to the evaluation device 17 later. For example, the sensor device 14 can detect and store a measurement sequence at specific time intervals—see the explanations given for FIG. 7. In this case, for example, the evaluation device 17 can be briefly connected to the interface 16 during a downtime of the continuous casting line 1 and the vibration data SD of a plurality of measurement sequences can be read out cumulatively.

The present invention has many advantages. Firstly, signal acquisition can be carried out in a simple and reliable manner, even during operation of the continuous casting line 1. Furthermore, an evaluation of the acquired sensor signals SS or the vibration data SD derived from them can be carried out in a reliable manner. Furthermore, both the signal acquisition and the signal evaluation can be automated. In the case of an immediate transmission of the vibration data SD to the evaluation device 17, problems occurring in the continuous casting line 1 or its roller bearings 10 can be detected immediately, even during operation of the continuous casting line 1. Damaged and worn strand-guiding rollers 6 can be easily identified and localized. During operation of the continuous casting line 1, maintenance measures can be scheduled which should be carried out at the next shutdown of the continuous casting line. The availability and reliability of the continuous casting line 1 are increased. If a plurality of vibration sensors 15 are used for a single strand-guiding roller 6, it may also be possible to localize within a single strand-guiding roller 6 which roller bearing 10 is defective or worn.

Although the invention has been illustrated and described in greater detail by means of the preferred exemplary embodiment, the invention is not restricted by the examples disclosed and other variants can be derived therefrom by the person skilled in the art without departing from the scope of protection of the invention.

LIST OF REFERENCE SIGNS

1 continuous casting line
2 continuous casting mold
3 immersion tube
4 liquid metal
5 metal strand
6 strand-guiding rollers
7 gas cutting machine
8 strand-guiding sections
9 actuating devices
10 roller bearing
11 cooling water
12 rotary feed-throughs
13 supply lines
14 sensor device
15 vibration sensor
16 interface
17 evaluation device
18 analog-to-digital converter
19 energy source 20 control device
21 filter
22 amplifier
23 timer
24 operator
25 monitoring system
26 memory device
A, A' activation commands
BZ operating state
E energy content
E1 mean value of the energy content values
E2 maximum value of the energy content values
E3 intermediate value
f frequency
f1, f2 cutoff frequencies
FB frequency bands
FZ spectral decomposition
G1, G2 groups of strand-guiding rollers
LIM1, LIM2 limits
M message
MAX maximum of spectral decomposition
OFF passive state
ON activated state
P, P' passivation commands
S1 to S75 steps
SD vibration data
SS sensor signal
t time, or time points
t0 start time point
t1 start time
t2 end time
ta start time point
te end time point
tr resulting time point
T sampling time
T', T'' time periods
TR period
v extraction speed
Z status
z preliminary statuses
δE difference of energy values
δt time intervals

The invention claimed is:

1. A strand-guiding section of a continuous casting line, wherein the strand-guiding section is arranged downstream of a continuous casting mold of the continuous casting line,
wherein the strand-guiding section has at least one strand-guiding roller for supporting a metal strand that is cast with the continuous casting mold,
wherein the at least one strand-guiding roller is mounted in roller bearings in the strand-guiding section,
wherein the strand-guiding section has at least one sensor device, which in turn has at least one vibration sensor which is acoustically coupled to the at least one strand-guiding roller or the roller bearings thereof, by means of which vibrations occurring when the at least one strand-guiding roller is rotated in the roller bearings are detected,
wherein the at least one sensor device has an interface via which vibration data (SD) derived from detected vibrations are transmitted to an evaluation device,
wherein the at least one strand-guiding roller is cooled internally by cooling water supplied to the at least one strand-guiding roller and the at least one vibration sensor is directly and acoustically coupled to the cooling water to detect the vibrations occurring when the at least one strand-guiding roller is rotated via direct contact with the cooling water.

2. The strand-guiding section as claimed in claim 1, wherein for supplying and/or discharging the cooling water, the at least one strand-guiding roller has a rotary feedthrough on at least one end, via which supply lines for supplying and/or discharging the cooling water are connected to the at least one strand-guiding roller, and the at least one vibration sensor is arranged on the rotary feedthrough.

3. The strand-guiding section according to claim 1, wherein the interface to the evaluation device is designed as a wireless interface, and the at least one sensor device has a separate, internal energy source.

4. The strand-guiding section as claimed in claim 1, wherein
the at least one sensor device is designed in such a way that it transfers from a passive state (OFF) to an activated state (ON) due to an internally monitored timeout or due to an activation command (A) received via the interface, and transfers from an activated state (ON) into the passive state (OFF) due to an internally monitored timeout or a passivation command (P) received via the interface, and
the at least one vibration sensor detects the vibrations that occur when the at least one strand-guiding roller is rotated only when the at least one sensor device is in the activated state (ON).

5. The strand-guiding section as claimed in claim 1, wherein The at least one vibration sensor detects the vibrations occurring when the at least one strand-guiding roller is rotated with a sampling rate that is at least in the two-digit kHz range.

6. The strand-guiding section according to claim 1, wherein the wireless interface is a radio interface.

* * * * *